United States Patent [19]
DeSimone

[11] Patent Number: 5,826,932
[45] Date of Patent: Oct. 27, 1998

[54] CARGO BED EXTENSION

[76] Inventor: Steve DeSimone, #1 Ibis Rd., Hilton Head Island, S.C. 29928

[21] Appl. No.: 603,281

[22] Filed: Feb. 20, 1996

[51] Int. Cl.⁶ .................................................. B62D 25/00
[52] U.S. Cl. ....................................... 296/57.1; 296/26.11
[58] Field of Search ............................... 296/26, 37.6, 50, 296/51, 57.1, 61, 62, 27, 180.1

[56] References Cited

U.S. PATENT DOCUMENTS

| | | |
|---|---|---|
| 2,799,530 | 7/1957 | Drake . |
| 3,010,760 | 11/1961 | Trautmann ............................ 296/57.1 |
| 3,063,747 | 11/1962 | Anderson ............................. 296/57.1 |
| 3,976,209 | 8/1976 | Burton .................................... 296/61 |
| 4,023,850 | 5/1977 | Tillery ..................................... 296/26 |
| 4,472,639 | 9/1984 | Bianchi . |
| 4,531,773 | 7/1985 | Smith .................................. 296/57.1 |
| 4,735,454 | 4/1988 | Bernard . |
| 4,778,213 | 10/1988 | Palmer . |
| 4,813,842 | 3/1989 | Morton ................................ 296/57.1 |
| 4,861,088 | 8/1989 | Fedrigo ............................... 296/57.1 |
| 4,884,838 | 12/1989 | Slater . |
| 4,944,546 | 7/1990 | Keller ...................................... 296/61 |
| 4,951,991 | 8/1990 | Haigler . |
| 5,154,470 | 10/1992 | Bringham, Jr. . |
| 5,156,432 | 10/1992 | McCleary ............................... 296/61 |
| 5,342,105 | 8/1994 | Miles ...................................... 296/61 |
| 5,478,130 | 12/1995 | Matulin et al. ......................... 296/51 |
| 5,597,195 | 1/1997 | Meek .................................. 296/57.1 |

Primary Examiner—Joseph D. Pape
Attorney, Agent, or Firm—Vanophem Meehan & Vanophem, P.C.

[57] ABSTRACT

A bed extension for use with vehicles equipped with cargo beds. The bed extension is configured to enable oversized cargo to be securely carried on a cargo bed while minimizing the hazards commonly associated with carrying such oversized loads. The bed extension is constructed of struts and/or tubing, including an internal truss arrangement, that promotes the structural rigidity of the extension while contributing minimal weight. When stowed, the bed extension preferably occupies the same space as would a stock tailgate of the vehicle.

10 Claims, 1 Drawing Sheet

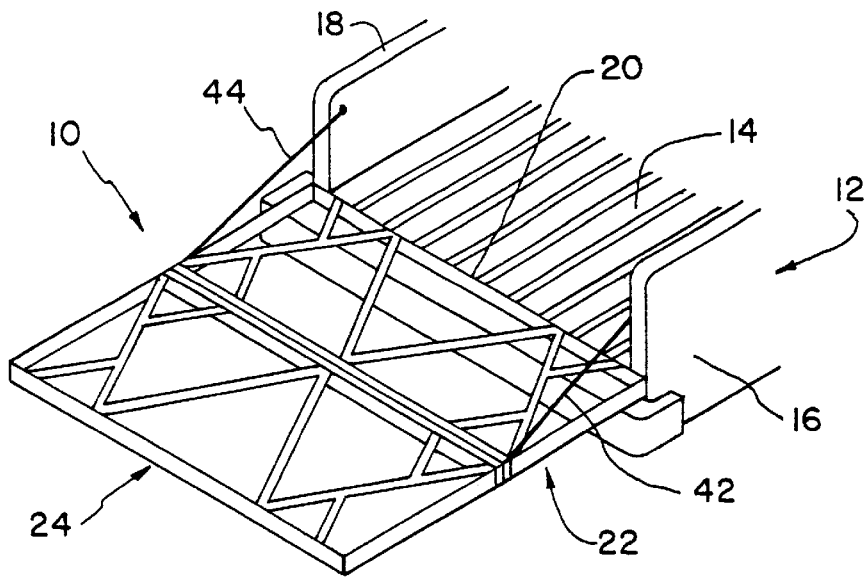
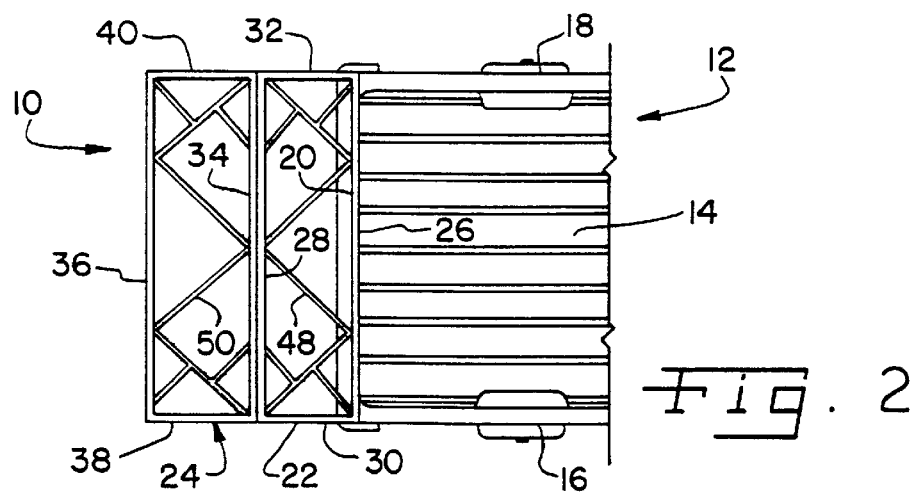
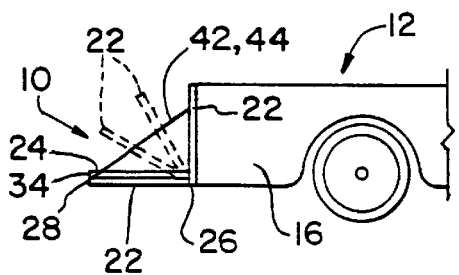
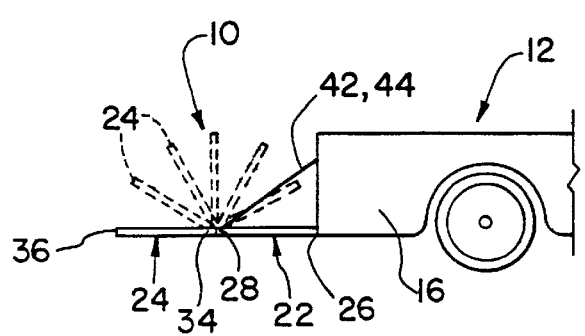

CARGO BED EXTENSION

BACKGROUND OF THE INVENTION

1. Field of the Invention

This invention generally relates to bed extensions for use on trucks or other similar vehicles equipped with a cargo bed. More particularly, this invention is directed to a bed extension that enables safe transport of oversized loads that would otherwise extend beyond the cargo bed of the vehicle.

2. Description of the Prior Art

Pickup trucks and similarly configured vehicles are equipped with a cargo bed in which cargo of a variety of sorts can be transported. A limitation on the versatility of such vehicles arises when the cargo to be transported is longer than the cargo bed, and thus projects from the end of the vehicle. This situation frequently occurs when transporting construction materials and machinery, and prompts significant practical and safety concerns during transportation of the cargo. For instance, the cargo can be damaged if its weight causes the portion projecting beyond the bed to become deformed. Furthermore, the cargo is likely to fall from the back of the bed if it cannot be adequately secured. At minimum, this latter occurrence can result in severe damage to the cargo. Of even greater concern is that the transportation of oversized cargo may present a hazard to other motorists if the cargo happens to fall from the bed while the vehicle is in transit.

Often as a temporary solution to the problem, a person will ride in the cargo bed along with the cargo during transit in order to monitor the cargo, and possibly even hold the cargo to prevent its falling from the vehicle. However, this solution not only needlessly exposes persons to potentially life-threatening hazards, but is also an inefficient use of manpower. Therefore, the prior art has suggested various remedies to allow for the safe transportation of oversized cargo on cargo beds that are otherwise inadequate to sufficiently support the length of the cargo.

U.S. Pat. No. 4,951,991 to Haigler suggests a telescoping bed extension that is attachable to the frame of a pickup truck. The extension accommodates cargo that is substantially longer than the cargo bed of the truck with a telescoping pole assembly that can be extended beyond the end of the bed. The device suggested by Haigler further includes a pair of vertical members that extend upward to limit movement of an oversized cargo on the bed. While the teachings of Haigler offer a solution to the basic problem of transporting oversized cargo, the bed extension has several drawbacks that can substantially limit its usefulness. First, the telescoping construction of the bed extension inherently has limited rigidity, therefore significantly limiting the payload which it can support. Secondly, the bed extension must be assembled and disassembled between uses. To be deployed, the telescoping members must first be extended, then the vertical members must be attached for use and then removed thereafter for storage. In addition, because the bed extension is secured to the truck frame below the cargo bed, the extension does not provide a support surface that is coplanar with the cargo bed, and ground clearance is significantly reduced at the rear of the truck.

Other bed extensions have been suggested that not only extend the usable length of the bed, but also have a panel construction that includes rearward and side walls to enclose the bed, as taught by U.S. Pat. No. 4,472,639 to Bianchi, U.S. Pat. No. 4,778,213 to Palmer, and U.S. Pat. No. 5,154,470 to Bringman, Jr. While such bed extensions serve to enable oversized cargo to be safely transported on an otherwise undersized cargo bed, they share a shortcoming noted with the teachings of Haigler—namely, assembling and deployment of these extensions is time consuming and arduous. Furthermore, since such devices completely enclose the cargo bed, they limit the length of the objects that can be accommodated within the bed. As such, any objects that are longer than the extension cannot be safely transported. Finally, the use of side panels that attach to the side walls of the vehicle may provide added structural integrity, but disadvantageously require assembly between uses and require the use of substantial amounts of material, adding additional weight to the vehicle.

Though basically unrelated to bed extensions intended to accommodate oversized cargo, other forms of truck accessories having a somewhat similar construction include various attachments that form ramps for loading and unloading cargo, examples of which include U.S. Pat. No. 3,976,209 to Burton, U.S. Pat. No. 4,735,454 to Bernard, and U.S. Pat. No. 4,884,838 to Slater. Each provides a ramp that is collapsible and can be contained within the bed of the vehicle when the ramp is not in use. However, this type of attachment has significant drawbacks as a direct result of being designed to provide a ramp for loading and unloading cargo, rather than directed toward enabling safe transportation of oversized cargo.

With reference to the teachings of Bernard, an attachment composed of two oversized panels is provided to form a ramp having an acceptable grade. Because the panels form a ramp, their construction must provide a surface that is sufficiently solid and continuous across which the cargo can be easily moved. As such, the panels are inherently heavy and, when stowed, extend well above the bed of the truck thus significantly interfering with the rearward view of the driver of the vehicle. The teachings of Slater avoid the latter shortcomings of Bernard by providing a ramp formed by a single oversized panel that attaches directly to the distal edge of a tailgate. In contrast to Bernard, Slater's oversized panel forms an inclined air foil that extends into the cargo bed when stowed. Similar to Slater, Burton also teaches an attachment to the original tailgate of a pickup truck. However, Burton requires the use of two panels attached to the tailgate, and a strut arrangement to reinforce a hinge between the panels when the panels are deployed to form a ramp.

As a practical matter, each of the ramps taught by Bernard, Burton and Slater must be sufficiently rigid and strong in order to support the entire weight of the cargo as it is loaded and unloaded from the cargo bed, and provide a nearly continuous surface over which the cargo can be transported. As such, the attachments that form their ramps inherently add considerable weight to a pickup truck, and therefore reduce the cargo payload that a truck could otherwise transport. Furthermore, the required size of the panels results in a significant amount of cargo space being occupied by the panels when stowed (Slater and Burton), or interfere with the rearward view of the truck's operator (Bernard). Finally, because of the different design considerations of a ramp, the teachings of Bernard, Slater and Burton do not solve the problems confronted when trying to safely transport oversized cargo on a cargo bed that is too short to sufficiently support the length of the cargo.

In light of the above, it can be seen that a truck cargo bed extension is needed that can safely accommodate and support oversized cargo. More specifically, a bed extension is needed such that when in use it provides the necessary support to transport an oversized cargo safely, but in a manner that does not incur excessive weight or interfere with the vehicle operator's visibility when the device is not in use. In addition, such a device would preferably provide the needed structural integrity to support oversized cargo, while not having an overly complex design.

SUMMARY OF THE INVENTION

In accordance with this invention, a bed extension for a pickup truck cargo bed is provided, in which the bed extension is characterized by a rigid yet low weight structure that enables oversized cargo to be safely transported. The bed extension of this invention can be easily mounted on a pickup truck by removing the existing tailgate and replacing it with the bed extension. Thereafter, the bed extension can be pivoted between a deployed position in which the bed extension is approximately coplanar with the cargo bed, and a stowed position in which it is approximately perpendicular to the bed without interfering with the rearward view of the truck's operator.

Generally, the bed extension includes two sections, each of which is preferably rectangular in shape so as to have opposing longitudinal edges and opposing lateral edges approximately transverse to the longitudinal edges. The sections are not solid panels, but instead each is preferably constructed to have a truss arrangement whose trusses are oriented obliquely to the edges of the sections in order to promote the rigidity thereof while contributing minimal weight. A first of the sections is pivotably attached at a first of its longitudinal edges to the rear edge of the cargo bed, while a first longitudinal edge of the second section is pivotably attached to the opposing second longitudinal edge of the first section. The sections are pivotably attached such that the first longitudinal edge of the second section abuts the second longitudinal edge of the first section when the sections are deployed, thereby physically maintaining the sections coplanar. As such, special support and attachment hardware are not required to attach the second section to the truck. Instead, the support hardware used to support the truck's original tailgate can be used to support the first section, while the second section can be supported solely by the hinges which secure the second section to the first section. This aspect of the invention is made possible by the truss construction of the first and second sections, which minimizes the weight of the sections while providing ample rigidity.

From the above, it can be seen that the two sections act in combination to provide a hinged bed extension that substantially increases the effective length of the cargo bed. When the bed extension is not needed, it can be readily folded onto itself for easy storage. To do so, the second section is pivoted from its deployed position, in which it extends coplanar with the first section, until it lays atop of the first section. The two sections together can then be pivoted back to a substantially perpendicular position relative to the bed, where the bed extension can be safely secured while not in use. In this manner, the bed extension of this invention can be easily and quickly deployed and stowed, without complicated attachments or the use of tools.

Another significant advantage of this invention is that the sections of the bed extension are preferably sized such that, when stowed, the bed extension does not obstruct the rearward view of the driver when stowed. Because the sections are not required to function as a ramp, the height of each section (the distance between their longitudinal edges) can be limited to the height of the side walls of the cargo bed. Furthermore, the truss arrangement ensures that an occupant of the truck will be able to see through the sections when in their stowed position. Therefore, this invention enables the operator of the vehicle to have a better rearward view than when the original tailgate was attached.

Accordingly, it is an object of this invention to provide a bed extension that enables oversized cargo to be safely transported on the cargo bed of a pickup truck.

It is a further object of this invention to provide a bed extension that is designed to have sufficient structural rigidity to support the cargo without contributing excessive weight to the truck, and without requiring special hardware to support the bed extension from the truck.

It is another object of this invention to provide a bed extension that has an uncomplicated operation.

It is still a further object of this invention to provide a bed extension that causes minimal interference with the rearward view of occupants of the truck.

Other objects and advantages of this invention will be more apparent after a reading of the following detailed description taken in conjunction with the drawings provided.

BRIEF DESCRIPTION OF THE DRAWINGS

FIG. 1 is a perspective view of a truck cargo bed equipped with a bed extension in accordance with a preferred embodiment of this invention;

FIG. 2 is a plan view of the bed extension of FIG. 1;

FIG. 3 shows a side view of the bed extension, illustrating a first section of the bed extension being deployed; and FIG. 4 shows a side view of the bed extension illustrating a second section of the bed extension being deployed, so as to fully extend the bed extension.

DETAILED DESCRIPTION OF THE PREFERRED EMBODIMENT

As seen in FIGS. 1 through 4, a pickup truck 12 is shown that includes a cargo bed 14 and a pair of side walls 16 and 18. The side walls 16 and 18 are oppositely-disposed along the longitudinal sides of the bed 14, and project perpendicularly upward from the bed 14 as is conventional. As is also conventional, the bed 14 terminates at a rear edge 20 at which a tailgate or other suitable barrier would typically be attached. While a pickup truck 12 is represented in the Figures, those skilled in the art will appreciate that the teachings of this invention are generally applicable to any type of vehicle equipped with a cargo bed adapted to transport cargo.

In accordance with the invention, a bed extension 10 is attached to the bed 14 at its rear edge 20, and serves to safely accommodate oversized cargo on the bed 14 that would otherwise extend beyond the rear edge 20 of the truck 12. The bed extension 10 is shown to include a first section 22 attached at the rear edge 20 of the bed 14, and a second section 24 attached to the first section 22. As more readily seen in FIG. 2, the first and second sections 22 and 24 have rectangular shapes. The first section 22 is delineated by first and second longitudinal edges 26 and 28 and first and second lateral edges 30 and 32 that are transverse to the longitudinal edges 26 and 28. The first longitudinal edge 26 is pivotably attached to the rear edge 20 of the bed 14 with any suitable hinge-type hardware (not shown). The distance between the first and second longitudinal edges 26 and 28 define a height of the first section 22, while the first and second lateral edges 30 and 32 define a width of the first section 22. Similarly, the second section 24 includes first and second longitudinal edges 34 and 36, and first and second lateral edges 38 and 40. The first edge 34 of the second section 24 is pivotably attached to the second longitudinal edge 28 of the first section 22, again with any suitable type of hardware (not shown).

FIGS. 1 and 2 represent the bed extension 10 in a fully deployed position, while FIG. 3 represents the bed extension 10 being articulated between a stowed position and an intermediate position, and FIG. 4 represents the bed extension 10 being articulated between the intermediate position and the deployed position. As is apparent from FIGS. 1 and 4, the bed extension 10 is substantially coplanar with the bed 14 when in its deployed position. Furthermore, the widths of the first and second sections 22 and 24 are roughly equal to the distance between the side walls 16 and 18, such that the bed extension 10 serves as a gate for the cargo bed 14 when in its stowed position.

As shown in the Figures, the first section 22 is suspended from the truck 12 in order to achieve its desired coplanar orientation. In accordance with this invention, the first section 22 may be suspended by the attachment hardware originally provided with the truck 12, such as cables 42 and 44 as shown, though it is foreseeable that other attachment hardware could be used. As shown, the cables 42 and 44 are preferably attached to the sidewalls 16 and 18 of the truck 12 and to the lateral edges 30 and 32 of the first section 22 near its second longitudinal edge 28.

As is apparent from FIGS. 1 and 4, the second section 24 is then rigidly supported coplanar with the first section 22 by configuring the sections 22 and 24 such that the first longitudinal edge 34 of the second section 24 abuts the second longitudinal edge 28 of the first section 22 when the bed extension 10 is deployed. This face-to-face abutment alleviates the requirement for additional support hardware, and therefore simplifies the use of the bed extension 10. While such an arrangement would be impractical if the first and second sections 22 and 24 were solid panels, and therefore relatively heavy, the first and second sections 22 and 24 are each constructed of a network of trusses 48 and 50, respectively, which minimize the weight of the sections 22 and 24 while promoting their rigidity. Specifically, the trusses 48 and 50 are oriented obliquely to the longitudinal and lateral edges 26 through 40 of their respective sections, so as to maximize the rigidity of the first and second sections 22 and 24. Preferably, the first and second sections 22 and 24, including their trusses 48 and 50, are entirely constructed of struts, which provide a high stiffness-to-weight ratio. Suitable struts can be formed from tubing, such as tubing having a square-shaped cross section, and formed to have geometries such as those having an L-shaped cross section.

When the bed extension 10 is stowed, as shown in FIG. 3, both of the first and second sections 22 and 24 are vertical and substantially perpendicular to the bed 14. While in the stowed position, the bed extension 10 can be secured to the side walls 16 and 18 of the truck 12 with any suitable type of latch (not shown). As is apparent from FIG. 3, the height of each of the first and second sections 22 and 24 is not greater than, and preferably is approximately equal to, the height of the side walls 16 and 18 above the bed 14. As such, the first and second sections 22 and 24 do not project above the side walls 16 and 18 when the bed extension 10 is in its stowed position. Yet when fully extended, the first and second sections 22 and 24 significantly increase the effective length of the cargo bed 14, therefore enabling oversized cargo to be safely transported. In addition, construction of the first and second sections 22 and 24 with struts minimizes the required thickness of the first and second sections 22 and 24, enabling the bed extension 10 to fit within the same envelope that the original tailgate would require. As such, in a preferred embodiment of this invention, when stowed the bed extension 10 does not reduce the cargo space of the bed 14.

As shown in FIG. 3, deployment of the bed extension 10 entails simultaneously pivoting the first and second sections 22 and 24 from their vertical orientations to a horizontal orientation, until the first and second sections 22 and 24 are supported by the cables 42 and 44 attached to the first section 22. The second section 24 can then be pivoted from its position shown in FIG. 3 to its fully deployed position shown in FIG. 4. Stowing the bed extension 10 merely entails reversing this procedure.

In view of the above, it can be appreciated that the bed extension 10 of this invention offers significant advantages over the prior art. Because the first and second sections 22 and 24 each have a height approximately the same as the side walls 16 and 18, the first and second sections 22 and 24 do not project above the side walls 16 and 18 when stowed, and therefore promote safe operation of the truck 12 by not interfering with the rearward view of the truck's occupants when the bed extension 10 is not in use.

Furthermore, the bed extension 10 of this invention is preferably constructed entirely of struts or tubing, including a network of trusses 48 and 50 interconnecting the outermost members of the first and second sections 22 and 24, in order to impart the necessary structural rigidity to the bed extension 10. Such a construction maximizes the rigidity and strength of the bed extension 10 for its weight, thereby enabling the second section 24 to be supported solely by its face-to-face abutment with the first section 22. In addition, the first and second sections 22 and 24 can be constructed and sized to occupy the same amount of space as the original tailgate such that, when stowed, the cargo space of the bed 14 is not reduced. The bed extension 10 of this invention is also relatively light for its size, and thus is relatively easy to operate while still significantly increasing the length of the cargo bed 14.

While the invention has been described in terms of a preferred embodiment, it is apparent that other forms could be adopted by one skilled in the art. Accordingly, the scope of the invention is to be limited only by the following claims.

What is claimed is:

1. A bed extension for a vehicle including a bed and first and second side walls on opposite sides of said bed, said first and second side walls extending to a predetermined vertical height above said bed, said bed having an end extending across a rear portion of said vehicle, said bed extension being pivotably movable between a stowed position perpendicular to said bed and a deployed position coplanar with said bed, said bed extension comprising:

a first member having a base edge, an oppositely-disposed distal edge, opposing lateral edges oriented transverse to said base and distal edges, and a truss arrangement comprising trusses oriented obliquely to said base, distal and lateral edges, said first member having a height as measured between said base and distal edges thereof, said first member having a width as measured between said lateral edges thereof, said base edge being pivotably attached to said end of said bed such that said first member is pivotable between said stowed position and said deployed position where said first member is substantially coplanar with said bed of said vehicle;

a second member having a base edge, an oppositely-disposed distal edge, opposing lateral edges oriented transverse to said base and distal edges of said second member, and a truss arrangement comprising trusses oriented obliquely to said base, distal and lateral edges, said second member having a height as measured between said base and distal edges thereof, said second member having a width as measured between said lateral edges thereof, said base edge of said second member being pivotably attached to said distal edge of said first member such that said second member is pivotable between said deployed position in which said second member is coplanar with said first member and said stowed position in which said second member overlays said first member such that said second member is stored within said side walls of said bed and said first member in said stowed position; and means for supporting said bed extension, said supporting means having one end attached to said lateral edges of said first member and an opposite end attached to said first and second side walls of said vehicle;

wherein when said bed extension is in said stowed position said heights of said first and second members are not greater than said vertical height of said first and second side walls of said bed, such that said bed extension does not project above said first and second side walls when in said stowed position and said bed extension provides support for cargo carried by said bed that extends beyond said bed when said bed extension is in said deployed position.

2. The bed extension of claim 1 wherein said first and second members are maintained coplanar in said deployed position as a result of said distal edge of said first member abutting said base edge of said second member.

3. The bed extension of claim 1 wherein said supporting means comprises a first cable attached to said first side wall and said first member, and a second cable attached to said second side wall and said first member.

4. The bed extension of claim 1 wherein said heights of said first and second members are substantially equal to said vertical height of said first and second side walls.

5. The bed extension of claim 1 wherein each of said first and second members is rectangular in shape.

6. The bed extension of claim 1 wherein said width of said first member is substantially equal to a distance between said first and second side walls.

7. The bed extension of claim 1 wherein said width of said second member is substantially equal to a distance between said first and second side walls.

8. The bed extension of claim 8 wherein said vehicle is characterized as having a space occupied by a tailgate, said tailgate being replaced by said bed extension, wherein said first and second members are configured and sized so as to occupy said space when said bed extension is in said stowed position.

9. A bed extension for a vehicle having a bed and first and second side walls on opposite sides of said bed, said first and second side walls extending a vertical height above said bed, said bed having an end extending across a rear portion of said vehicle, said bed extension being pivotably movable between a stowed position perpendicular to said bed and a deployed position coplanar with said bed, said bed extension comprising:

first and second members, each of said first and second members comprising a base strut, an oppositely-disposed distal strut, opposing lateral struts oriented transverse to said base and distal struts, and a plurality of trusses oriented obliquely to and interconnecting said base, distal and lateral struts; and means for supporting said bed extension, said supporting means being attached to said lateral struts of said first member from said first and second side walls of said vehicle;

such that when said bed extension is in said stowed position each of said first and second members has a height as measured between said base and distal struts thereof, each of said first and second members has a width as measured between said lateral struts thereof that is substantially equal to a distance between said first and second side walls, said base strut of said first member is pivotably attached to said end of said bed such that said first member is pivotable between said stowed position and said deployed position where said first member is substantially coplanar with said bed of said vehicle, said base strut of said second member is pivotably attached to said distal strut of said first member such that said second member is stowed between said side walls and said first member, said second member further being pivotable between said stowed position in which said second member overlays said first member and said deployed position in which said second member is coplanar with said first member, said first and second members are maintained coplanar in said deployed position as a result of said distal strut of said first member abutting said base strut of said second member, and said heights of said first and second members are not greater than said vertical height of said first and second side walls such that said bed extension does not project above said first and second side walls when in said stowed position and said bed extension provides support for cargo carried by said bed that extends beyond said bed when said bed extension is in said deployed position.

10. The bed extension of claim 9 wherein said vehicle is characterized as having a space occupied by a tailgate, said tailgate being replaced by said bed extension, wherein said first and second members are configured and sized so as to occupy said space when said bed extension is in said stowed position.

* * * * *

UNITED STATES PATENT AND TRADEMARK OFFICE
CERTIFICATE OF CORRECTION

PATENT NO. : 5,826,932
DATED : October 27, 1998
INVENTOR(S) : Steve DeSimone

It is certified that error appears in the above-identified patent and that said Letters Patent is hereby corrected as shown below:

Column 7, line 46, kindly delete numeral "8" and insert

---- 1 ----.

Signed and Sealed this

Eighth Day of June, 1999

*Attest:*

Q. TODD DICKINSON

*Attesting Officer*   Acting Commissioner of Patents and Trademarks